United States Patent [19]

Greenwell

[11] Patent Number: 4,518,301

[45] Date of Patent: May 21, 1985

[54] ORBITAL FEEDER

[75] Inventor: Joseph D. Greenwell, Florence, Ky.

[73] Assignee: R. A. Jones & Co. Inc., Covington, Ky.

[21] Appl. No.: 395,288

[22] Filed: Jul. 6, 1982

[51] Int. Cl.[3] .............................................. B65G 59/10

[52] U.S. Cl. ...................................... 414/129; 221/36; 221/41; 271/95; 271/150; 271/31.1; 414/125; 414/330

[58] Field of Search ............... 271/30 A, 95, 129, 149, 271/150, 166, 152, 153, 154, 155; 414/37, 125, 129, 330; 221/36, 41, 42, 43, 303

[56] References Cited

U.S. PATENT DOCUMENTS

| | | | |
|---|---|---|---|
| 1,218.034 | 3/1917 | Young | 271/166 |
| 1,514,633 | 11/1924 | Schmidt | 271/166 |
| 1,708,441 | 4/1929 | Cole | 221/42 |
| 1,745,616 | 2/1930 | Hansen | 271/149 |
| 2,915,308 | 12/1959 | Matzen | 271/5 |
| 3,066,579 | 12/1962 | Brush | 493/318 |
| 3,285,605 | 11/1966 | Vasse | 271/166 |
| 3,302,946 | 2/1967 | Anderson | 271/95 |
| 3,386,558 | 6/1968 | Benatar | 198/408 |
| 3,831,930 | 8/1974 | Shimizu | 271/91 |
| 3,894,732 | 7/1975 | Müller | 271/155 X |
| 3,902,712 | 9/1975 | Dorer | 271/125 |
| 3,937,131 | 2/1976 | Kellogg | 493/310 |
| 3,937,458 | 2/1976 | Langen | 271/95 |
| 4,072,090 | 2/1978 | Heisler | 221/298 X |
| 4,178,839 | 12/1979 | Hughes | 271/107 X |
| 4,183,517 | 1/1980 | Hageman et al. | 271/150 |
| 4,232,591 | 11/1980 | Karpinsky | 493/314 |
| 4,285,509 | 8/1981 | Reid | 414/330 X |
| 4,298,422 | 11/1981 | Zodrow | 271/33 X |
| 4,429,864 | 2/1984 | Scarpa et al. | 271/30 A X |

FOREIGN PATENT DOCUMENTS

| | | | |
|---|---|---|---|
| 282478 | 3/1915 | Fed. Rep. of Germany | 271/150 |
| 2811159 | 9/1978 | Fed. Rep. of Germany | . |

OTHER PUBLICATIONS

IBM Technical Disclosure Bulletin, vol. 19, No. 2, Jul. 1976, Automatic Vacuum Feed Hopper.

*Primary Examiner*—Leslie J. Paperner
*Assistant Examiner*—Stuart J. Millman
*Attorney, Agent, or Firm*—Wood, Herron & Evans

[57] ABSTRACT

Apparatus for feeding flat folded cartons from a stationary magazine to a continuously moving conveyor. The magazine has a choke at its discharge end formed from parallel guides which are spaced apart a distance less than the distance between the two folded edges of the cartons. A rotary carrier is located adjacent the magazine and the conveyor. A plurality of planetary members with attached suction cups are rotatably mounted on the carrier. A fixed cam cooperates with cam followers mounted on the planetary members to cause the planetary members to rotate on their own axes as the carrier rotates to pick up cartons from the magazine, open them and deposit them gently between transport lugs on the conveyor.

7 Claims, 7 Drawing Figures

SOURCE OF AIR PRESSURE

VACUUM SOURCE

ORBITAL FEEDER

This invention relates to apparatus for transferring articles from one station to another, and particularly, the invention relates to apparatus for feeding flat folded cartons from a magazine, opening them and depositing them into transport lugs on a continuously-moving conveyor. While the invention is particularly applicable to use with cartoners and leaflet feeders, it should be understood that the principles of the invention can be applied to other areas where articles must be transferred from station to station.

In cartoning machines, flat folded cartons must be removed one at a time from a magazine, erected, and placed in tubular form between leading and trailing lugs of a continuously-moving transport conveyor. It has been the practice in many cartoners produced today to use reciprocating elements such as reciprocating vacuum cups to begin the removal of cartons from the magazine, pusher elements to eject the cartons from the magazines, reciprocating knives to hold the cartons in position and reciprocating elements to begin the erection of the cartons as they are picked up by transport lugs. Such usage of reciprocating elements requires that a significant portion of time is devoted to returning such elements back to their initial starting positions, thus limiting the time available for these elements to engage with and thereby perform their individual carton-handling functions. At high speeds, for example in excess of 200 cartons per minute, the reciprocating elements and the mechanism which drives them suffers considerable stress in addition to creating considerable noise. Additionally, the mechanisms must be built to close tolerances, and the many moving parts add to the cost and complexity of the cartoner.

It has been an objective of the present invention to avoid the use of reciprocating feeding and erecting elements by providing a continuously-rotating feeder which places suction cups against the cartons in the magazine, withdraws the cartons from the magazine and deposits them in erected condition in the transport lugs in a manner which is most efficient in usage of the total time available to perform these functions.

The concept of a rotary feeder presents its own problems. The cartons in the magazine are stationary, and it is therefore not possible to simply wipe past the cartons with a suction cup and be able to pick up the cartons with any degree of reliability. Proposals to solve this problem have been to provide a rotary carrier having suction cups mounted on planetary elements, either chain driven or gear driven, so that the suction cups move in a hypocycloidal path. If the rotating suction cups have three revolutions for every revolution of the carrier, the path of the suction cups resembles an equilateral triangle whose sides are arcuate. At one of the points to the triangle, the cups will move generally perpendicularly into and out of the plane of the carton so as to engage and withdraw the carton in a generally perpendicular path. Such devices are disclosed in U.S. Pat. Nos. 2,915,308, 3,302,946 and 3,937,458. The problem with the hypocycloidal movement is that the generally perpendicular movement in and out at the tip of the triangle does not lend itself to the most gentle and therefore reliable opening of a carton into continuously moving transport lugs. Such apparatus therefore is not particularly adapted for high speeds because the path of movement of each suction cup does not provide enough time to open and place the open carton between the transport lugs.

There have been other approaches to rotary feeders which would appear to be attempts to deal with some of the problems referred to above, but these have required rather complex mechanisms such as gears and cams with linkages in an attempt to create the desired path of movement for picking up the cartons and depositing them between transport lugs. U.S. Pat. Nos. 3,386,558, 3,831,930 and 3,937,131 are representative of such approaches.

Another objective of the present invention has been to provide a carton feeder employing a modification of a conventional hypocycloidal motion wherein the suction cups carried as part of rotating planetary elements rotate at non-uniform speeds during each revolution of the carrier, the non-uniform speeds imparting to the cups motions which enable the cartons to be picked up from a stationary magazine and deposited into continuously-moving transport lugs.

It has been another objective of the present invention to provide a feeding apparatus wherein cartons can be fed into transport lugs at speeds in excess of 400 cartons per minute.

The foregoing objectives of the invention are attained by providing a rotating carrier having at least one planetary member rotatably mounted in the carrier. The planetary member carries at least one suction cup for picking up a carton and carries a plurality of cam follower rollers. A stationary, generally circular, cam is mounted adjacent the carrier for engagement with the follower rollers. The cam consists of a plurality of pockets of non-uniform pitch which cooperate with the rollers to cause the suction cups to engage the cartons with a conventional straight-in and straightout component of motion and thereafter to cause the suction cups to descend into the space between the lugs of the transport conveyor in a generally U-shaped path having a substantial horizontal component of motion. In the preferred form of the invention, the U-shaped path permits the deposit of the carton to occur over a period of about twice the length of time which would be permitted by conventional hypocycloidal motion. Thus, the apparatus of the present invention permits an operation at substantially greater speeds than would be possible with a conventional hypocycloidal motion while reliably opening cartons into a tubular shape as they are brought into engagement with the transport lugs.

Another objective of the present invention has been to provide for the erecting of the carton as it is introduced into the transport lugs with minimal or no requirement of additional elements such as guides and the like. This objective is attained in part by the use of the combined suction cup and channel-shaped member described and claimed in the patent of Hughes, U.S. Pat. No. 4,178,839, but additionally and importantly, through the path of movement of the suction cup with respect to the transport lugs so that as the suction cups convey the cartons into the space between the transport lugs, a trailing edge of the carton is aligned with and against the trailing transport lugs and the carton is gradually opened to an erected tubular form of rectangular cross section.

Another objective of the invention has been to provide an improved magazine which permits the loading of a very large supply of cartons upstream of the leading carton without applying any substantial pressure on the leading carton such as would require stops and the like to be sufficiently engaged to prevent the discharge of cartons due to pressure of the upstream supply and which therefore makes difficult the withdrawal of the cartons because of their being clamped behind such stops by such upstream supply pressure.

In accordance with this feature of the invention, the magazine is provided, at its discharge end, with a choke formed by two spaced parallel guides, the guides being spaced apart a distance less than the dimension between the folded edges of the carton in the magazine. One edge, the leading edge, of each carton in the choke will tend to slide toward the discharge end of the magazine. Sliding out of the magazine is resisted by a small detent at the discharge end of the magazine. The opposite edge will have its forward movement blocked by its engagement with the guide, and it is here that the pressure of all of the upstream cartons is absorbed. Additionally, pins or rods are positioned immediately past the downstream end of the choke to engage the carton flaps to hold them lightly and only as insurance against inadvertent discharge from the magazine. As cartons are withdrawn from the magazine, the upstream cartons will slide past the choke and will be retained only lightly by the flap-engaging pins. These leading cartons have no significant pressure on them and are therefore easily withdrawn from the magazine.

The several objectives and features of the present invention may be more readily understood from the following detailed description taken in conjunction with the accompanying drawings in which.

Figure 1:
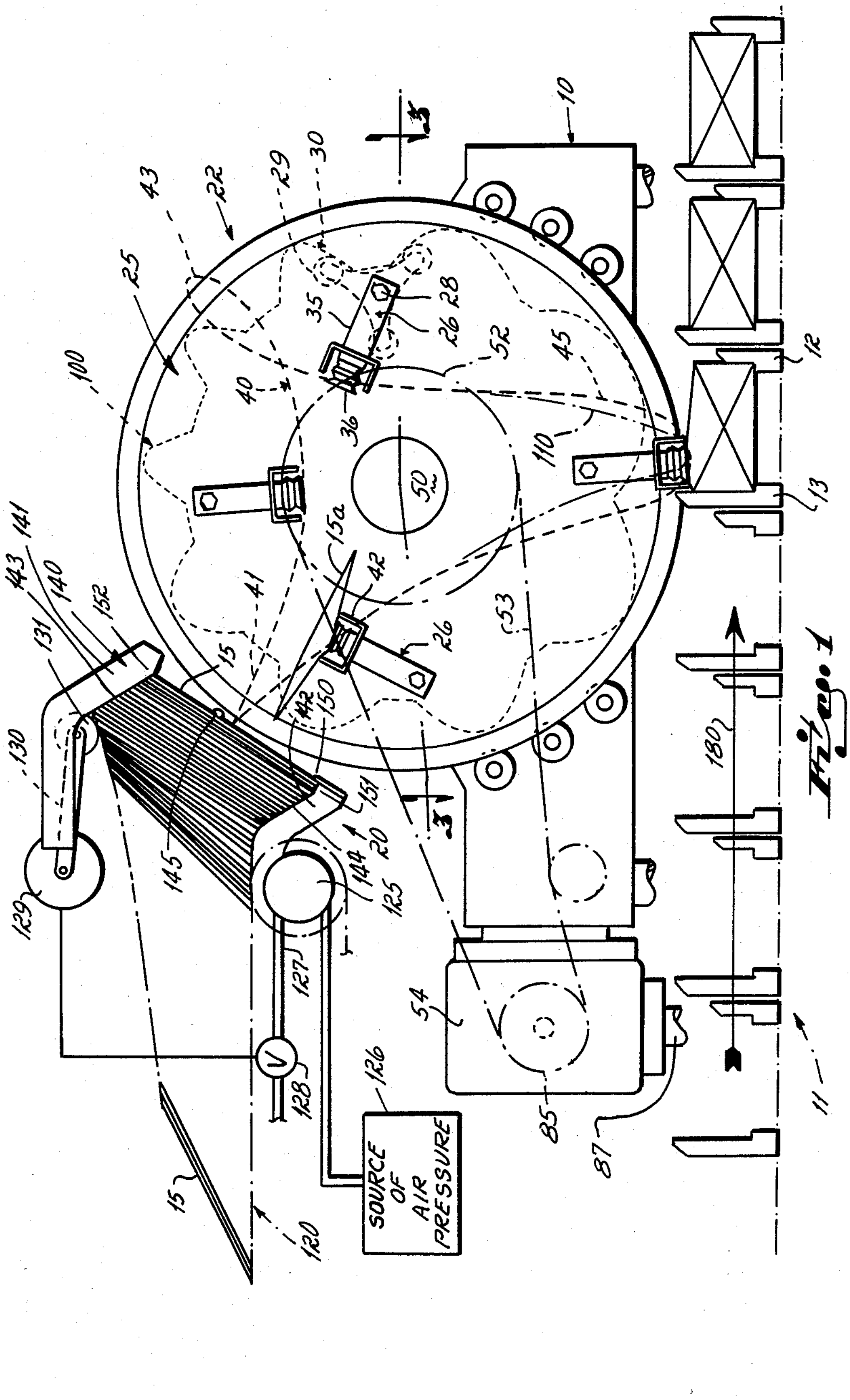
FIG. 1 is a diagrammatic side view of a carton transfer apparatus and a carton magazine constructed in accordance with the principles of this invention.
Figure 2:
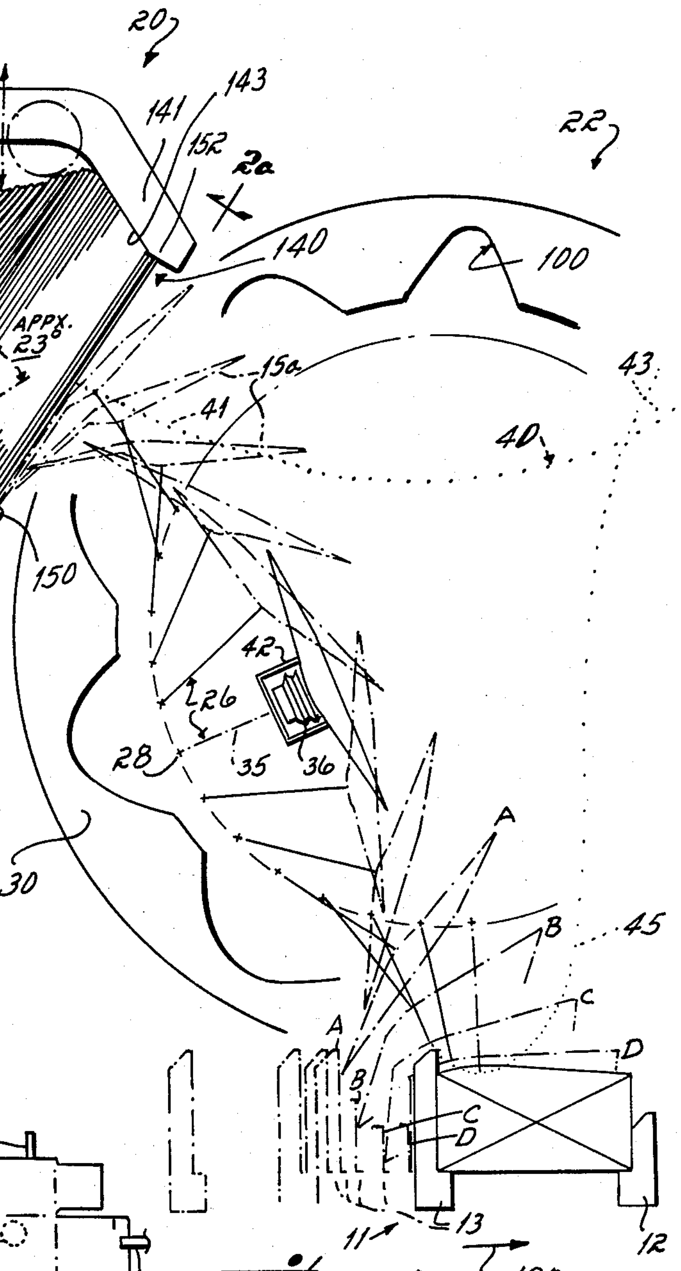
FIG. 2 is an enlarged diagrammatic view illustrating a carton being erected while in the process of being brought from the magazine and placed into a transport lug.
Figure 2A:
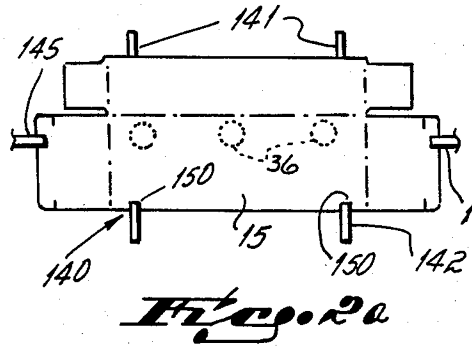
Figures 3, 5:
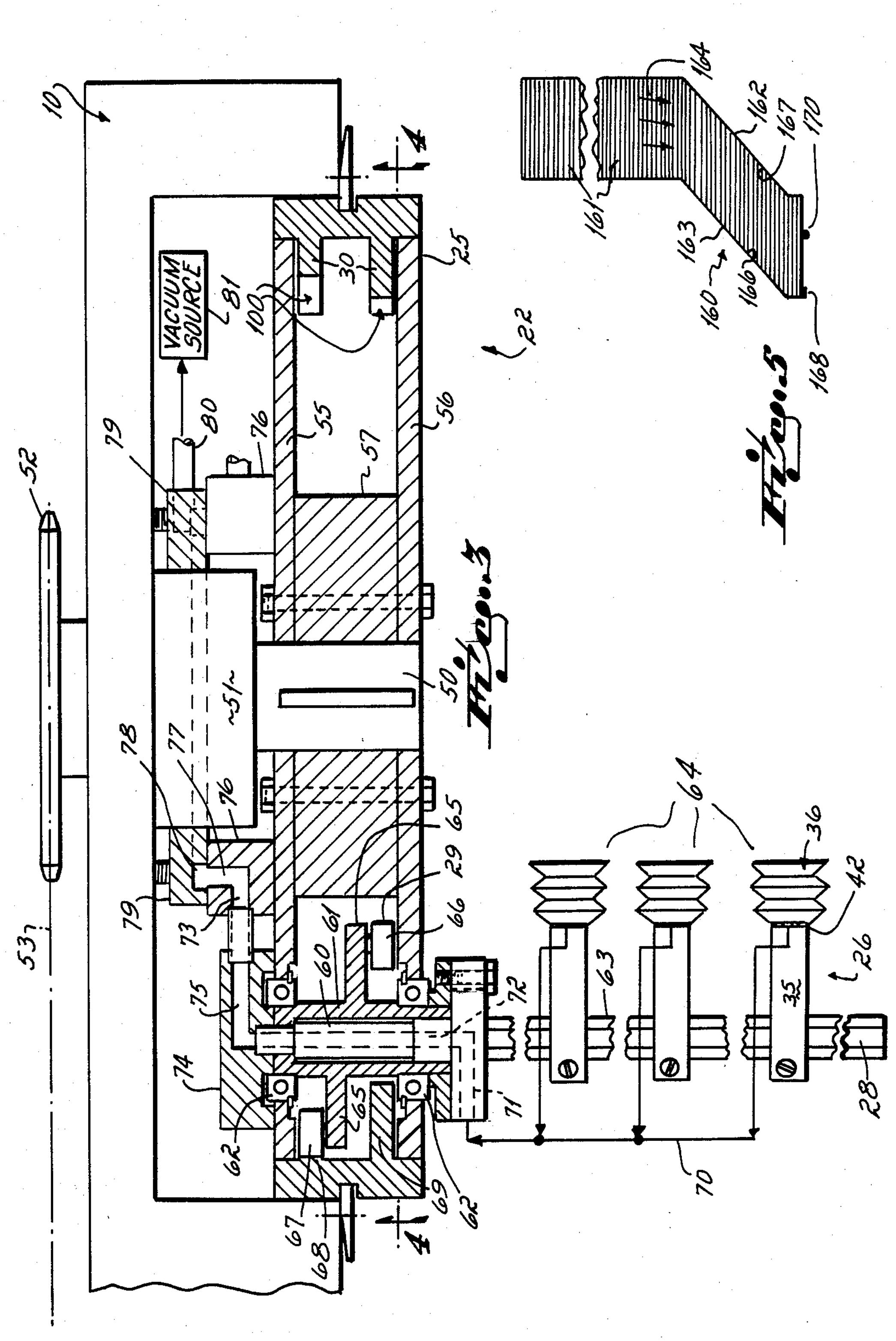
Figure 4:
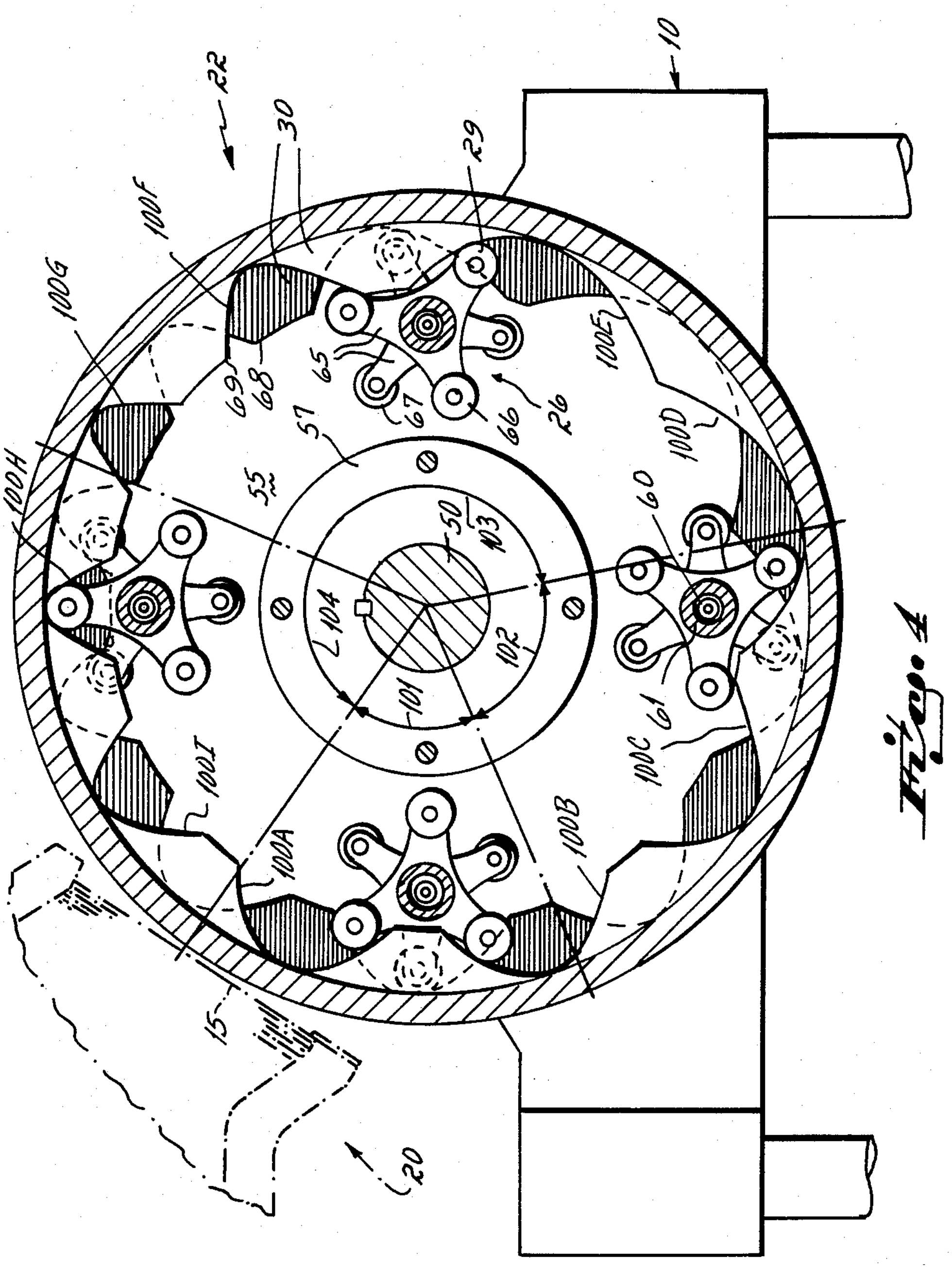
Figure 6:
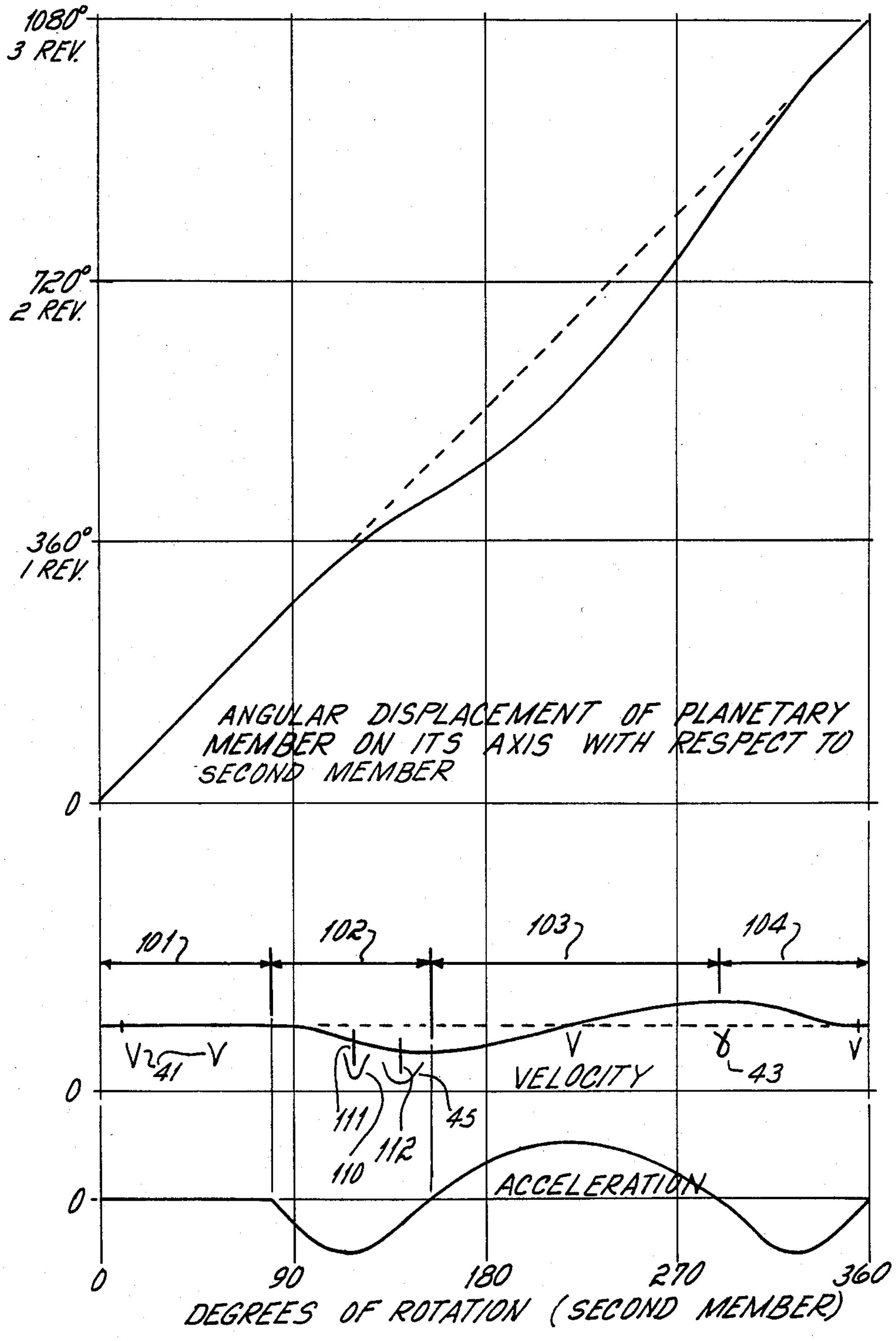

FIG. *2a* is a cross-sectional view of the magazine taken along line *2a*—*2a* of FIG. 2;

FIG. 3 is a cross-sectional view taken along line 3—3 of FIG. 1;

FIG. 4 is a cross-sectional view taken along line 4—4 of FIG. 3;

FIG. 5 is a diagrammatic illustration of an alternative form of a magazine; and FIG. 6 is a series of curves depicting displacement, velocity and acceleration of the planetary elements.

GENERAL ORGANIZATION

Referring particularly to FIG. 1, the apparatus includes a frame 10. An endless transport conveyor 11 is mounted on the frame and carries a series of leading transport lugs 12 and trailing transport lugs 13 which create receptacles into which the opened carton is to be deposited. The cartons are indicated at 15 and are stacked in a magazine 20.

Between the magazine 20 and the transport conveyor is a transfer mechanism 22. The transfer mechanism is mounted on the frame and has a rotating planetary carrier 25. A plurality of planet members 26 are rotatably mounted on the carrier 25. Each rotary member has a shaft 28 having fixed to it cam rollers 29. The cam rollers cooperate with fixed cams 30 which are mounted on the frame. An arm 35 is mounted on each shaft 28 and carries a suction cup 36.

In the general operation, which will be described in detail below, the carrier 25 is rotated in a counterclockwise direction as viewed in FIG. 1. The followers 29 moving along the cam 30 cause the suction cups to move in a path shown by the broken line 40. In one portion of the path indicated at 41, the suction cup moves substantially straight into the magazine to engage the leading carton 15 substantially perpendicularly to the plane of the carton. The suction cup withdraws generally perpendicularly to the plane of the carton carrying the carton with it. At this point, the carton is partially open as shown in FIG. 2 at *15a* through the combination of the channel-shaped element 42 and the suction cup 36 as shown in Hughes U.S. Pat. No. 4,178,839.

As the carrier continues its rotation, and the carton continues its excursion toward the transport conveyor, the carton is carried into engagement with the trailing transport lug 13. The engagement of the partially opened carton with the trailing transport lug gradually causes the carton to open in a sequence of steps generally depicted in FIG. 2 and labeled as steps A through D.

In the descent of the suction cup in between the transport lugs, the suction cup follows a generally U-shaped path indicated at 45. While in the U-shaped path, the vacuum cup has a velocity component of substantial magnitude in a direction the same as and parallel to the direction of the continuously-moving transport conveyor and provides a substantial portion of the carton cycle. For a carton having a width of two inches and a length of six inches in the direction of the transport lugs, about 145° of cycle time is available for deposit of the carton to permit the carton to be opened and deposited between the lugs. A full cartoner cycle is considered to be 360°.

THE TRANSFER MECHANISM

The transfer mechanism is best illustrated in the cross-sectional view of FIG. 3.

As indicated above, the transfer mechanism 22 is mounted on a frame 10 fixed to the cartoner. The carrier 25 is mounted on a shaft 50, the shaft being supported by bearings in journal 51 of the frame 10. A sprocket 52 is mounted on one end of the shaft 50 and has a chain 53 connecting it via gear box 54 to the main drive of the cartoner so that it is rotated in sychronism with the components of the cartoner. At the other end of the shaft 50, the carrier 25 is mounted. The carrier is formed of an inner plate 55 and an outer plate 56 which have a hub 57 sandwiched between them, the whole assembly being bolted together by a plurality of axially-extending bolts 58.

Each planet member 26 is equiangularly and equiradially spaced around the carrier 25. Each includes the shaft 28 which is formed of an inner tube 60 and an outer flanged sleeve 61 which are fixed together. The sleeve 61 is rotatably mounted within the plates 55 and 56 by bearings 62. The inner tube 60 has an extension 63 to which one or more suction cup assemblies 64 are secured, three being illustrated.

The sleeve 61 has annular flanges or supports 65 to which three equiangularly spaced outer rollers 66 are mounted and three equiangularly spaced inner roller 67 are mounted. The inner rollers and outer rollers are annularly spaced from each other by an angle of 60°. (One trio of these rollers is shown as 29 in FIG. 1.)

Fixed to the frame are an inner cam track 68 upon which rollers 67 ride and an outer cam track 69 on which the outer rollers 66 ride. The combination of six rollers cooperating with two cam tracks provides assurance that at any portion of the excursion of the carrier throughout its 360° rotation, at least two rollers will be in engagement with cam surfaces to keep the planet member positively engaged with the cam surfaces.

Vacuum is selectively applied to the suction cups between the point at which they pick up a carton from the magazine and the point at which they have completed their deposit of the opened carton between the transport lugs. Working from the vacuum cup toward the vacuum source, the vacuum cups are connected through flexible tubes 70 to a transverse bore 71 in the shaft 28. The transverse bore is connected to an axial bore 72 in the inner tube 60. A rotary union connection 74 has a passageway 75 connected to the bore 72. The passageway 75 is connected via a hose to a passage 73 of to an annular ring 76 fixed to the inner plate 55. The passageway 73 terminates in an axial bore 77 which communicates with an arcuate channel 78 formed in an annular ring 79 which is fixed to the frame 10. The arcuate channel 78 has a circumferential dimension long enough to provide the communication of the vacuum to the suction cup during the period that it moves from the magazine 20 to the transport conveyor 11. The channel 78 is connected by a passageway 80 to a vacuum source 81.

The chain 53 is connected to a drive sprocket 85 which is mounted on the gear box 54 which is driven in turn by a shaft 87 connected to the main cartoner drive mechanism.

The shape of the inner and outer cams 68 and 69, respectively, is important, While different cam designs can be created to accomplish the desired functions of the present apparatus by those skilled in the art of cam design, it is critically important that the cam and follower relationship be such as to impart a non-uniform rotary motion to the orbiting planetary members as they make their excursion.

The particular form of the orbiting motion will vary depending upon the application to which the transfer apparatus is put. In the instant embodiment of the invention, the transfer mechanism is designed to pick a carton from a fixed magazine and move it into the space between continuously-moving transport lugs to open it. In another environment, the apparatus might pick an article from a continuously-moving supply and deposit it into a fixed receptacle. In such event, the cam surface would be different but would not depart from the scope of the present invention. In general in the instant embodiment, as best shown in FIG. 4, the cams are formed as a series of pockets 100A to 100I. Beginning with pocket 100A and viewing in a counterclockwise direction, the pitch distance between adjacent pockets increases to a maximum at a point approximated by the location 100D. Further in the counterclockwise direction, pitch distance between adjacent pockets decreases to a minimum value in a position approximately as shown by pockets 100G and/or 100H. Further counterclockwise spacing of the pockets 100D, 100G, pitch distance between adjacent pockets increases back to the pitch distance between pockets as shown in position 100A.

This change in pitch distances between the pockets causes the planetary members 26 to rotate at a uniform velocity associated with a normal hypocycloidal motion through arc 101; a decreasing velocity through arc 102 as the cartons are being deposited in the transport lugs; increasing velocity through arc 103 to readjust, so to speak, for some of the angular retardation that was effected through arc 102, decreasing velocity through arc 104 to the velocity level experienced through arc 101, thus completing the adjustment for angular retardation such that the planetary members have returned back to their original positions and therefore will retrace their same motion path upon each complete rotation of carrier 25.

Reference has been made above to the shape of the outer cam 69. The inner cam 68 is correspondingly formed so as to cooperate with outer cam 69 in imparting to the rotating planetary member differing velocities which will be described below. The design of the cams is well within the skill of the cam designer, equations for the shapes of the cams being found in standard textbooks such as *Mechanisms and Dynamics of Machinery*, Third Edition, H. H. Mabie & F. W. Ocvirk, Publisher John Wiley & Sons, Inc. Referring to FIG. 6, there are shown a plurality of curves depicting the angular displacement, the angular velocity and the angular acceleration of the planetary member about its own axis as the carrier rotates through 360°. There are in general four curve segments 101, 102, 103 and 104 within the 360° rotation of the carrier. In the first portion of the excursion, as the planetary member moves past the magazine to pick up a carton, the angular displacement is of constant slope or rate. The velocity is constant and the acceleration is zero. These are characteristics that would be found in a conventional hypocycloidal motion where a planetary member rotates at a uniform velocity about its own axis throughout the 360° rotation of the carrier. At the magazine, it will impart to the suction cup the path depicted at 41 in FIG. 1 wherein the suction cup moves substantially straight in toward the carton and pulls substantially out away from the magazine.

In the second portion of the excursion, 102, the displacement is on a gradually decreasing slope. The velocity decreases to a minimum value. The planetary member gradually decelerates until it reaches the end of the portion of the excursion 102 at which acceleration is again zero. During the excursion through the arc 102, the motion of the pick-up will gradually change to a U-shaped motion, which is the preferred motion, and deposit the cartons between the transport lugs in the illustrated form of the invention.

Having slowed the rotational velocity down, in the next portion of the excursion depicted at 103, the planetary member in the illustrated form of the invention is accelerated to increase its velocity to a maximum value as indicated on the velocity curve.

Finally, in the final portion of the excursion 104, the velocity is brought back to its starting point at the beginning of excursion 101. This general form of curve is required for the planetary members to have three revolutions on their own axes during one revolution of the carrier. In a two-revolution system, the excursion 103–104 could have been combined to provide a gradual increase of velocity up to the starting velocity of excursion 101. Suitable curves could also be prepared for systems in which the planetary member has two, four or more revolutions.

The illustrated form of the apparatus is adapted for the transfer of cartons having centers other than five or six inch centers as, for example, a three inch center. This permits the same feeder to be used to perform the cartoning function on cartons which are carried on three inch centers but on the same machine frame. The six inch center machine can be used to run cartons from approximately one inch in length (machine direction) to five inches in length. Such a machine would be less efficient when running the smaller cartons and, hence, the company using the machine might prefer to have a three inch center machine for the smaller cartons so that they can be run closer together in the cartoning apparatus with higher speeds thus being achievable. In converting the illustrated machine to a three inch center machine, the transport conveyor, the barrel loader and some associated drives would have to be changed, but the feeding mechanism could remain the same thus reducing the inventory of feeding mechanisms required by the carton machine manufacturer.

It should be understood that the carton center dimensions are for illustrative purposes and that the same principles would be applied to larger or smaller centers.

To make the conversion from a six inch center to a three inch center machine and to retain the desired motion characteristics of the vacuum cups in relationship to the motion desired to remove the carton from the magazine and the motion desired to place the carton into the transport lugs, it is only necessary to circumferentially relocate cam surfaces 68 and 69. In a three inch center machine, the trailing lug which engages the carton to effect the opening will move correspondingly a shorter distance than the trailing lug on the six inch center machine does through the movement during which the carton is opened and deposited. If the curve 40 depicted in FIG. 1 was to be used on a three inch center machine, as the suction cup moves between the transport lugs the component of the movement of the suction cup that is parallel to the motion of the transport lugs would become greater in velocity than that of the trailing transport lug and opening could not as efficiently be effected. Therefore, the portion 45 of the curve 40 for the smaller center is desired to be narrower as depicted in the broken line 110 (FIG. 1) so as to permit proper contact of the carton with the trailing transport lug during the shorter distance that the transport lug travels on the three inch center machine.

When the cams are shifted, the motion path of the suction cup will necessarily be shifted. By rotating the suction cups on their shafts, correction can be made so that the suction cups will engage the cartons at the positional attitude as depicted by the portion 41 of the curve 40.

Turning again to the curves of FIG. 6, it can be seen that if the cams are shifted so that deposit into the lugs is made at the point 111 on the curves, the shape of the curve will be narrower than the shape of the curve when deposit is made on a large center cartoner at point 112.

It should be understood that the invention admits of differing changes in motion. For example, the carrier could run in a counterclockwise direction and change the direction of movement of the transport conveyor, thereby carrying the cartons through approximately 240° more or less from the magazine to the transport lugs. Alternatively, it is deemed possible to design the system so as to deposit cartons at the portion of the curve indicated at 43.

THE MAGAZINE

As indicated above, an objective of the invention has been to provide a choke at the downstream end of the magazine which resists the pressure of the incoming cartons whether it be the pressure created by the conveyor bringing in new cartons or whether the pressure arises from gravity in the event that the magazine is vertically or otherwise oriented as contrasted to the horizontal orientation in the illustrated form of the invention.

Referring again to FIG. 1, the magazine includes an endless horizontal conveyor 120. The conveyor has chains which present a series of transverse notches 121 (best illustrated in FIG. 2). These notches engage the lower edges of the cartons 15 and cause them to move forward as the conveyor is operated. Other conveyor arrangements are recognized as practical so long as they frictionally or otherwise engage the cartons sufficiently to cause them to move forward in the desired manner.

An air motor 125 is provided to drive the conveyor. The air motor is operated by a source of air pressure 126. The exhaust 127 to the air motor is connected to an air valve 128. The air valve is opened and closed by an air switch 129 which is intermittently operated by a lever 130 having a roller 131 rotatably mounted at its free end. as the carton supply is diminished by continued withdrawal of cartons from the magazine, the forward cartons will tend to lean forward thereby dropping the roller 131 slightly (one-eighth inch, for example). The dropping of the roller will operate the air switch which in turn opens the exhaust valve 128 permitting the air motor to operate. As the air motor operates, a new supply of cartons will be moved forward causing the upper edges of the forward cartons to raise and thereby reversing the position of the air switch. Thus, the combination of the detector roller 131 and the air system including the air motor will intermittently, cause the supply of cartons to be maintained. Other means of driving and control can be employed without departing from the scope of the invention.

The choke portion of the magazine is indicated at 140. It consists of two parallel guides, namely, an upper guide 141 and a lower guide 142. If the guides were vertical, as they could be in some embodiments, reference could be made to an upstream guide 141 and a downstream guide 142 considered in relation to the rotation of the carrier. The guides present an upper surface 143 on the upper guide and lower planar surface 144 on the lower guide. These surfaces are parallel and are spaced apart a distance which is less than the dimension of the carton between its folded edges. As a consequence, the cartons lying between the guides lie generally in planes which are at an acute angle with respect to a line perpendicular to the surfaces 143 and 144. In the illustrated form of the invention, that angle is about 23°. That angle can be varied depending upon the width of the cartons, the attitude of the guides and the coefficient of friction between the cartons and the surfaces 143, 144.

It can be observed that the incoming cartons tend to lean (and press) upon the upper portions of the cartons in the choke and apply a force to the cartons in the choke. That force is resisted by the engagement of the upper edges of the stack of the cartons in the choke against the surface 143.

At the downstream end of the choke, the choke opens up to permit cartons to be removed. As cartons are withdrawn one by one, the lower edges of the upstream cartons will slide along the surface 144. That sliding movement is resisted only by the coefficient of friction between the cartons and the surface 144.

The lower carton guide which supports the leading edge of the carton has a detent 150 which provides the primary resistance to the cartons sliding out of the choke along surface 144. The pins 145 simply provide secondary resistance to the leading cartons falling out of the magazine as they might pivot around the detent 150. To prevent the cartons from inadvertently falling out of the magazine, short fingers or pins 145 engage the flexible end flaps of the cartons. As the suction cup pulls a carton from the magazine, the end flaps bend with respect to the fingers 145 to effect the release of the carton. While it is not necessary, it is preferred to have a short storage surface 151 on which a few, e.g., four or five, cartons which are freed of the choke rest. It is preferred to have an opposite surface 152 spaced away by the dimension of the carton between its folded edges so as to prevent an inadvertent popping up of a carton over detent 150 to cause it to become loose when the leading carton is removed by the suction cup as can happen because of a vacuum effect between the leading and the next adjacent carton, machine vibration, etc.

It can be appreciated that this simplistic, but nevertheless effective, choke permits the magazine upstream of the choke to be loaded with many cartons, the combined weight of which or driving force imposed by cannot be transmitted to the leading carton and therefore will not adversely affect the ability to pull the leading carton out of the magazine. The extraction of the carton is thus not impeded by the necessity of providing sufficient stops on the forward surface of the carton as would be necessary to resist the substantial force of the cartons behind it.

Viewed another way, the cartons in the stack are in three conditions. The upstream portion or incoming supply of cartons lie at an acute angle to the conveyor 120, the angle being forward opening, that is, opening in the direction of movement of the cartons. The cartons are thus piled generally one upon each other to create a substantial pressure or force at the forwardmost carton of that group. Immediately downstream are the cartons in the choke. The carbons in the choke lie at a rearwardly opening acute angle to the surface 144. Those cartons have their upper or trailing edges placed against the surface 143 which resists the pressure of the incoming supply of cartons. The lower ends of the cartons in the choke are free to slide down the surface 144 except to the extent that they are impeded by the detent 150. The downstream group, be it one or more cartons, depending upon the length of the storage surface 151, are substantially entirely free of pressure from upstream cartons. As each of the downstream cartons is removed, the next adjacent carton is free to slide along the surface 144. As the leading edge slides past the surface 144 of the choke, the trailing edge will move past the surface 143 of the choke and thus the entire carton will be free and available for extraction by the passing suction cup.

An alternative form of the magazine is shown in FIG. 5 and is used with a cartoner where it is desired to have the cartons lying in a horizontal plane for cooperation with known ejecting apparatus.

In that embodiment, the choke is depicted at 160 and the incoming supply at 161. As in the previous embodiment, the choke presents two parallel surfaces 162 and 163. The cartons in the choke lie at an acute angle to a line perpendicular to the surfaces 162, 163. The choke operates as in the previous embodiment. The force of the cartons in the supply 161 is in the direction of the arrows 164. That force is distributed over the cartons in the choke in such a way that the left-hand edges or leading edges 166 are free to slide and the right-hand or trailing edges 167 bear against the surface 162 and are retained by it. At the discharge end of the choke, a detent 168 is provided for engagement with the left-hand or leading edge of the cartons to prevent them from sliding along the surface 163. As the cartons are removed from the discharge end of the magazine, the upstream cartons will tend to slide along their left-hand edges toward the discharge end of the magazine until they pass the surfaces 162 and 163 and are thereby free from the pressure of the upstream cartons. Preferably retaining fingers or pins 170 are provided to prevent the cartons from falling through the discharge end of the carton until they are picked up by a suction cup or other ejecting mechanism. The pressure that the retaining fingers 170 has to resist is very slight, being only the weight of the few cartons, two or three, at the lower end of the magazine which have passed through the choke.

Preferably, the choke should be long enough that the surface 162 underlies the complete length of the cartons in the supply 161. This provides assurance that the force of the cartons in the supply will be resisted only by the surface 162. If the choke was too short, the weight of the supply will not be resisted to the maximum extent by surface 162. The remaining force would undesirably but necessarily be resisted by detent 168 and/or stops 170.

OPERATION

In the operation of the invention, cartons are loaded into the magazine as shown in FIGS. 1 and 2. The drive and vacuum system for the machine is energized and the carrier 25 begins to rotate. A first suction cup will move in the generally V-shaped path 41 of the curve 40 to engage a carton. That carton is comparatively loosely held in the discharge end of the magazine because the pressure of the upstream cartons has been resisted by the choke. The suction cup is in the form of a bellows as illustrated. When vacuum is applied and it contacts the surface of a carton it tends to bow that surface into the channel member 42 which straddles the suction cup. In bowing the carton between the edges of the channel member, the carton is partially open as shown in FIG. 1.

The center of the suction cup follows the path of the broken line curve 40. Referring to FIG. 2, the suction cup rotates about its axis until it brings the lower edge of the carton into contact with the trailing transport lug at the position indicated at A. During the simultaneous movement of the suction cup down between the transport lugs and the linear movement of the transport lugs in the direction of the arrow 180, the lower edge of the carton slides along the forward surface of the transport lug, the suction cup imparting a complimentary component of motion to the carton with respect to the transport lug. These combined motions through positions depicted at B, C, and D force the carton to a fully open or erected condition as shown in FIGS. 1 and 2.

During this portion of the movement of the suction cup, it follows a comparatively shallow U-shaped path 45 of the curve 40. During this portion of its movement, it can be seen that it has a substantial horizontally-moving component of motion in the direction of horizontally moving transport lugs. By carrying the carton horizontally with respect to the transport lugs as the carton enters a space between the transport lugs, a comparatively long period of time during the cartoner cycle is provided for the erecting of the carton. This comparatively long period of time permits the carton to move gently contact and slide along the trailing transport lugs, thereby greatly reducing the violence of contact between carton and transport lugs and the likelihood of bending the carton into an L-shape as would occur if an unmodified hypocycloidal motion was imparted to the movement of the suction cups. This gentle action, approximately doubling the time available to introduce the carton between the transport lugs, as contrasted to a unmodified hypocycloidal motion, permits the carton feeder to run at approximately twice the speed with no greater rate of opening of the cartons as they are deposited between the carton lugs.

When the carton is placed between the transport lugs, the suction cups are vented to atmosphere and can move through the rest of their excursion around to the magazine. At the magazine, vacuum is reapplied and the next carton is extracted.

At the magazine, as each leading carton is removed, the upstream cartons in the choke will tend to slide along the surface 144 toward the discharge end of the magazine. As each carton lower edge slides slightly, the upper edge will be correspondingly be free to slide down the surface 143 until it is resisted by its bearing against the surface 143. As indicated above, further sliding of the cartons is resisted by the detent 150.

Having described my invention, I claim:

1. A magazine for carton feeding apparatus comprising, a substantially horizontal conveyor for conveying cartons resting on their lower edges, said cartons leaning forward toward the discharge end of the magazine, a choke at the discharge end of the conveyor, said choke comprising, a downwardly-inclined lower guide (142), an upper guide (141) above said lower guide and positioned forward of said lower guide, said lower and upper guides having parallel surfaces (144), (143) spaced apart a distance less than the dimension of the cartons (15) between their folded edges, so as to cause the cartons to lie between the guides at an angle to a line perpendicular to the surfaces (143), (144), with the upper edges of said cartons leading against said upper surface (143), whereby as the leading cartons are advanced between said guides, said cartons, leading forward and urged by gravity to fall through said guides, have their upper edges restrained by said upper guide, thereby removing substantially all of the pressure of the upstream cartons between the guides from the leading carton at the discharge end of the guide.

2. A magazine as in claim 1 further comprising, a short storage surface forming an extension of the forward end of said lower guide, and means lightly restraining cartons resting on said lower surface from moving by gravity beyond said lower surface out of said magazine.

3. A magazine for carton feeding apparatus comprising, an infeed section having a planar surface for engaging the first edges of the cartons, a choke section having a first planar surface engaging said first edges of said cartons, and a second planar surface engaging the opposite edges of said cartons, said planar surfaces being spaced apart a distance less than the distance between said first and opposite edges of said carton, means for swinging said cartons from a forward opening acute angle with respect to said infeed planar surface to a rearward opening acute angle with respect to said choke first planar surface, whereby, in said choke section said carton opposite edges are restrained from forward movement by engagement with said second planar surface and hence relieve pressure on cartons ahead of the restrained cartons.

4. A magazine as in claim 1 further comprising:

an elongated endless conveyor for holding the upstream supply of cartons, means for driving said conveyor to advance cartons toward said guide, a detector adjacent said guides and engageable with the upper edges of said cartons, said driving means being responsive to a slight dip in the level of said detector to advance additional cartons.

5. A magazine as in claim 1 further comprising, a short storage surface forming an extension of the forward end of said guide, a shallow detent projecting upwardly from the downstream end of said storage surface, and detents engageable with the lateral edges of said cartons for temporarily holding said cartons in said magazine.

6. A magazine as in claim 1 in which said angle is large enough that said articles cannot self-lock between said spaced guides.

7. A magazine as in claim 1 in which the leading edge of each carton between said choke is capable of sliding on its guide surface, and in which the trailing edge of each carton is blocked from movement by its engagement with the adjacent guide until relieved by the discharge of a leading carton and thereby the adjacent guide absorbs the major portion of the force of the incoming supply of cartons.

* * * * *